Jan. 29, 1957  J. R. MacDONELL  2,779,622
CAR WINDOW DRAIN
Filed Jan. 10, 1955
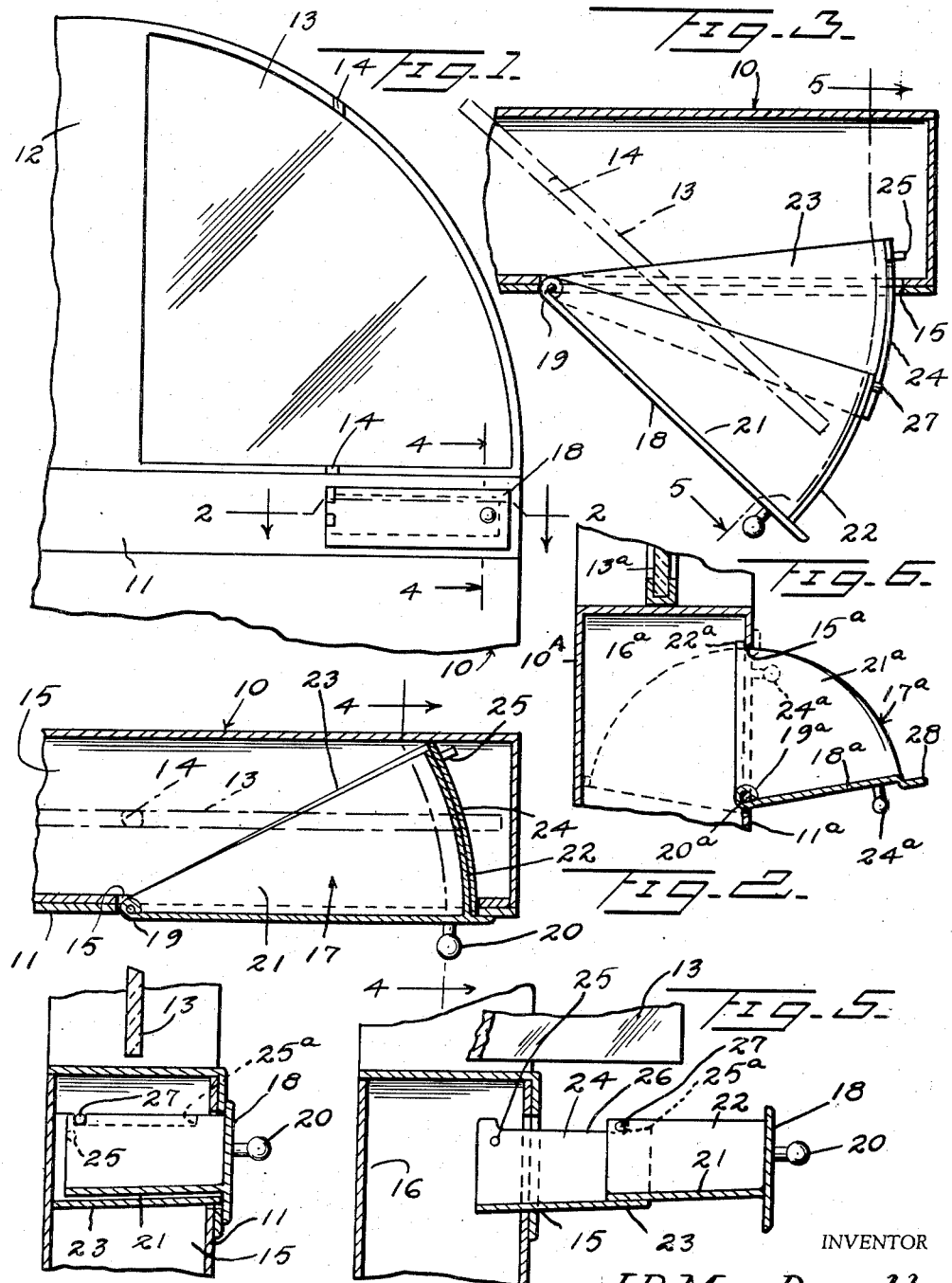
INVENTOR
J. R. MacDonell
BY Kimmel & Crowell
ATTORNEYS

United States Patent Office 2,779,622
Patented Jan. 29, 1957

2,779,622

CAR WINDOW DRAIN

John R. MacDonell, St. Marys, Ga.

Application January 10, 1955, Serial No. 480,716

4 Claims. (Cl. 296—44)

This invention relates to a car window drain and has particular applicability to those windows or ventilator sections which are pivotally mounted on a vertical axis in the side view window.

A primary object of this invention is the provision of a drip tray or the like, adapted to catch drainage from the section of such a pivoted window which extends interiorly of the vehicle and discharges such drainage to the exterior of the vehicle, thus to preclude damage to the upholstery or the like.

An additional object of the invention is the provision of a drainage tray of this character which may swing about a vertical axis substantially aligned with the pivotal axis of the window and to a point necessary to underlie the open window section to whatever extent the latter may be opened.

Another object of the invention is the provision of a drainage tray of the character to which reference has been made above, which may swing about a horizontal axis substantially perpendicular with respect to the pivotal axis of the window, to underlie the open window section to whatever extent the latter may be opened.

A further object of the invention is the provision of a tray of this character which, when not in use, may be folded into the interior of the vehicle door in such manner as to be inconspicuous and out of the way.

Still another object of the invention is the provision of such a tray comprised with a plurality of telescoping sections, whereby its overall bulk may be reduced to a minimum and at the same time provide a relatively wide drainage catching area.

Still other objects reside in the combination of elements, arrangement of parts, and features of construction, all as will be more fully pointed out hereinafter and shown on the accompanying drawing wherein there is disclosed a preferred embodiment of this inventive concept.

In the drawing:

Figure 1 is a side elevational view of one form of device embodying the instant invention as mounted on the interior of a vehicle door.

Figure 2 is an enlarged sectional view taken along the line 2—2 of Figure 1, as viewed in the direction indicated by the arrows, showing the tray in closed position.

Figure 3 is a view similar to Figure 2 but showing the device in open position.

Figure 4 is a sectional view taken substantially along the line 4—4 of Figure 1, as viewed in the direction indicated by the arrows.

Figure 5 is a sectional view taken substantially along the line 5—5 of Figure 3, as viewed in the direction indicated by the arrows.

Figure 6 is a sectional view of a modification of this invention.

Similar reference characters refer to similar parts throughout the several views of the drawing.

Having reference now to the drawing in detail, there is generally indicated at 10 a vehicle door, provided with a customary interior molding, and including a window 12 and a ventilator section 13, the latter being mounted for pivotal movement on a vertical axis on suitable pivots 14.

The molding 11 is provided with an aperture 15 which communicates with the interior 16 of the door 10, and has mounted therein a tray or drainage catcher generally indicated at 17, the latter including a front 18 of suitable ornamented design pivotally mounted on a hinge pin 19 to swing outwardly from the panel 11. An operating knob or handle 20 is provided to facilitate movement thereof.

The panel 18 comprises a portion of a tray which includes a sloping bottom 21, and an arcuate end wall 22, the bottom 21 being substantially sector shaped. Sector shaped bottom 21 overlies a second sector shaped member 23, comprising a second section of the tray 17, the latter also being provided with an end wall 24 of arcuate configuration. End wall 24 is provided with a stop pin 25 to preclude complete withdrawal of the drainage tray from the interior 16 of the door.

A channel 26 in the top of end wall 24 terminating in abutment 25a is adapted to engage a pin 27 carried by end wall 22 in such manner that after sector shaped tray 21 has been rotated outwardly to its fullest extent the pin 27 engaging abutment 25a will cause the further pivotal movement of sector shaped portion 23 to extend the parts to the position indicated in Figure 3 until the engagement of stop pin 25 limits further withdrawal thereof.

It will thus be seen that when the tray is fully extended and the ventilator 13 opened to the dotted line position indicated in Figure 3, inclined surfaces 21 and 23 will form a drainage tray or pan which will convey fluid back to the interior of the door and thence to the exterior of the vehicle.

In the modification of this invention shown in Figure 6, the door 10A includes an interior molding panel or strip 11a, a window (not shown), and a ventilator section 13a, the ventilator section 13a being pivotally mounted on a vertical axis in the manner described above.

The molding 11a is again provided with an elongated substantially rectangular aperture 15a which communicates with the interior 16a of the door 10, and has mounted therein a tray or drainage catcher generally indicated at 17a. The drainage catcher includes a front panel 18a which may be suitably ornamented and is mounted in a hinge barrel 19a by means of a pivot pin 20a which projects laterally from each side of the lower end of the front panel 18a.

A pair of arcuate end walls 21a are secured to each end of the front panel 18a and are provided with stop pins or lugs 22a which are adapted to engage against the marginal ends of the molding 11a adjacent the upper edge of the opening 15a when the tray 17a has been pivoted to the full line position shown in Figure 6.

The front panel 18a is provided with a handle or knob 24a and the outer end thereof is provided with an integrally formed flange 28 which serves to limit the inward movement of the panel 18a when it is moved to its closed or dotted line position as illustrated in Figure 6.

The end walls 21a and the front panel 18a serve to contain and convey rain or other fluid back to the interior of the door and then to the exterior of the vehicle in the manner described above, the lugs 22a maintaining the front panel 18a at an inclination to achieve this result.

If desired, the telescopic tray or drainage catcher illustrated in Figures 1 to 5, inclusive, may be extended to serve as a support for small objects, and it may also be used as a support for receptacles such as glasses or bottles. The tray 17a may also be adapted to serve these same functions.

From the foregoing it will now be seen that there is herein provided improved car window drain trays which preclude damage to the interior upholstery of the vehicle from drippage of the ventilator section which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

1. In a vehicle having interior and exterior spaced walls a window drain for use with pivotally mounted ventilator sections of vehicle windows secured to said spaced walls, a tray pivotally mounted interiorly of said vehicle on said interior wall beneath said section for receiving water dripping therefrom, and means communicating said tray with the space between said interior and exterior walls, said space communicating with the exterior of the vehicle.

2. A device as claimed in claim 1 in which said tray includes a plurality of telescoping sections foldable through a recess in said interior wall to a position between said spaced walls.

3. A device as claimed in claim 2 in which each of said telescoping sections is provided with outwardly inclined bottom walls.

4. A device as claimed in claim 1 in which said tray is comprised of an elongated substantially rectangular panel having a sector shaped wall at each end thereof, means pivotally connecting said panel to said interior wall with the axis of rotation of said panel extending substantially horizontally, means on said sector shaped end walls for limiting the movement of the upper end of said panel away from said interior wall, and means on said panel for limiting the movement of said panel toward said interior wall.

References Cited in the file of this patent

UNITED STATES PATENTS

| | | |
|---|---|---|
| 1,968,948 | Lang | Aug. 7, 1934 |
| 2,390,260 | King | Dec. 4, 1945 |
| 2,486,408 | Holbrook | Nov. 1, 1949 |
| 2,499,942 | Boyce | Mar. 7, 1950 |